(12) United States Patent  
Leddy et al.

(10) Patent No.: US 9,996,683 B2  
(45) Date of Patent: Jun. 12, 2018

(54) PHYSIOLOGICAL RESPONSE PIN ENTRY (71) Applicant: PAYPAL, INC., San Jose, CA (US)

(72) Inventors: William Joseph Leddy, Georgetown, TX (US); Bjorn Markus Jakobsson, Mountain View, CA (US)

(73) Assignee: PAYPAL, INC., San Jose, CA (US)

( * ) Notice: Subject to any disclaimer, the term of this patent is extended or adjusted under 35 U.S.C. 154(b) by 27 days.

(21) Appl. No.: 14/733,292

(22) Filed: Jun. 8, 2015

(65) Prior Publication Data

US 2015/0269371 A1 Sep. 24, 2015

Related U.S. Application Data (63) Continuation of application No. 13/413,063, filed on Mar. 6, 2012, now Pat. No. 9,083,532.

(51) Int. Cl.

| | |
|---|---|
| H04L 9/32 | (2006.01) |
| G06F 21/32 | (2013.01) |
| G07C 9/00 | (2006.01) |
| G06Q 20/40 | (2012.01) |
| G07F 7/10 | (2006.01) |
| G06F 21/31 | (2013.01) |
| G06F 21/36 | (2013.01) |
| H04L 29/06 | (2006.01) |

(52) U.S. Cl.
CPC ............. *G06F 21/32* (2013.01); *G06F 21/31* (2013.01); *G06F 21/36* (2013.01); *G06Q 20/40145* (2013.01); *G07C 9/00071* (2013.01); *G07C 9/00142* (2013.01); *G07F 7/1025* (2013.01); *G07F 7/1083* (2013.01); *H04L 9/3226* (2013.01); *H04L 9/3297* (2013.01); *H04L 63/0861* (2013.01); *H04L 2209/56* (2013.01)

(58) Field of Classification Search
CPC ... H04L 9/3231; G06F 21/32; G07C 9/00158; G06Q 20/40145
USPC .......................................................... 713/186
See application file for complete search history.

(56) References Cited

U.S. PATENT DOCUMENTS

| | | |
|---|---|---|
| 6,282,553 B1 | 8/2001 | Flickner et al. |
| 7,392,388 B2 | 6/2008 | Keech |
| 7,986,816 B1 | 7/2011 | Hoanca et al. |
| 8,117,458 B2 | 2/2012 | Osborn, III et al. |
| 2002/0095589 A1* | 7/2002 | Keech .................. G06F 21/6209 713/189 |

(Continued)

FOREIGN PATENT DOCUMENTS

| | | |
|---|---|---|
| GB | 2 281 838 A | 3/1995 |
| WO | WO 00/48076 A1 | 8/2000 |

(Continued)

OTHER PUBLICATIONS

Hirsch Electronics Product Datasheet, ScramblePad published in 2005 pp. 1-4.*

(Continued)

*Primary Examiner* — Ellen Tran  
(74) *Attorney, Agent, or Firm* — Haynes & Boone, LLP (57) ABSTRACT Methods and systems are provided for facilitating the secure entry of a user's PIN for electronic transactions such as merchant checkout, payment authorization, or access authorization. A physiological response of the user can indicate which one of a random sequence of numbers is a number of the user's PIN. For example, the user can blink, wink, or make a subtle facial movement to provide the indication.

20 Claims, 3 Drawing Sheets (56) References Cited

U.S. PATENT DOCUMENTS

| | | | |
|---|---|---|---|
| 2003/0076300 A1 | 4/2003 | Lauper et al. | |
| 2003/0210127 A1 | 11/2003 | Anderson | |
| 2005/0010768 A1 | 1/2005 | Light et al. | |
| 2005/0262555 A1* | 11/2005 | Waterland | G06F 21/36 726/21 |
| 2006/0089909 A1 | 4/2006 | McLeod et al. | |
| 2008/0137916 A1 | 6/2008 | Lauper et al. | |
| 2009/0276839 A1 | 11/2009 | Peneder | |
| 2010/0153735 A1* | 6/2010 | Guenthner | G06F 21/34 713/183 |
| 2010/0191653 A1 | 7/2010 | Johnson et al. | |
| 2010/0205667 A1 | 8/2010 | Anderson et al. | |
| 2011/0072375 A1 | 3/2011 | Victor | |
| 2011/0163956 A1* | 7/2011 | Zdralek | G06F 3/017 345/158 |
| 2012/0110634 A1 | 5/2012 | Jakobsson | |

FOREIGN PATENT DOCUMENTS

| | | |
|---|---|---|
| WO | WO 2005/010836 A1 | 2/2005 |
| WO | WO 2008/081452 A2 | 7/2008 |
| WO | WO2011066381 | 6/2011 |
| WO | WO 2012/004395 A1 | 1/2012 |
| WO | WO 2012048087 | 4/2012 |

OTHER PUBLICATIONS

PCT International Search Report and the Written Opinion dated Mar. 13, 2014, in related International Application No. PCT/US2013/058321.

NPL Hirsch Electronics ScramblePad® published in 2005.

M. Kumar et al., "Reducing Shoulder-surfing by Using Gaze-based Password Entry", published in 2007.

A. De Luca et al., "Evaluation of Eye-Gaze Interaction Methods for Security Enhanced PIN-Entry", published in 2007.

'Blue Moon Authentication', Blue Moon [online], Jan. 6, 2009. Retrieved on Jun. 4, 2012. Retrieved from the internet: <http://blue-moon-authentication.com/>.

'Visual Blue Moon Authentication', Blue Moon[online], Dec. 19, 2009. Retrieved on Jun. 4, 2012. Retrieved from the internet: <http://securitycartoon.com/bluemoonvisual/setup.php>.

'Something you know . . . Something you are . . . Something you have . . . silently protecting you', Ravenwhite Inc. [online], Feb. 2, 2011. Retrieved on Jun. 4, 2012. Retrieved from the internet: <http://www.ravenwhite.com/>.

'Visual Blue Moon Authentication', Blue Moon [online], Feb. 3, 2011. Retrieved on Jun. 4, 2012. Retrieved from the internet: <http://visual-blue-moon-authentication.com/>.

'Visual Blue Moon Authentication', Blue Moon [online], Feb. 2, 2011. Retrieved on Jun. 4, 2012. Retrieved from the internet: <http://mobile-blue-moon-authentication.com/>.

'I forgot my password! (Now what?) The Blue Moon Authentication System', Ravenwhite Inc. [online], Feb. 8, 2011. Retrieved on Jun. 4, 2012. Retrieved from the internet: <http://www.ravenwhite.com/iforgotmypassword.html>.

Method of Access Control via Gestural Verification by IBM Published in 1993, 2 pages.

European Search Report for European Patent Application, No. EP 13 84 1562, dated Mar. 4, 2016.

* cited by examiner

PHYSIOLOGICAL RESPONSE PIN ENTRY

CROSS REFERENCE TO RELATED APPLICATIONS

This application is a continuation of U.S. patent application Ser. No. 13/413,063, filed on Mar. 6, 2012, entitled "PHYSIOLOGICAL RESPONSE PIN ENTRY", the full disclosure of which is incorporated by reference herein in its entirety and for all purposes.

BACKGROUND

Technical Field

The present disclosure generally relates to electronic transaction authorization and, more particularly, to facilitating secure entry of a personal identification number (PIN), such as at an automatic teller machine (ATM), point of sale, or public web browser.

Related Art

The use of a personal identification number (PIN) to facilitate the identification of a person is well known. For example, a user can enter a PIN to make a purchase at a point of sale, to use an automatic teller machine (ATM), to use a public web browser at an Internet café, to use a kiosk such as Coinstar, or to share a console such as an Xbox game for multiple players.

According to contemporary practice, the PIN is entered using a numeric keypad. That is, the user manually presses a series of keys on the keypad that correspond to the numbers of the PIN.

A user frequently needs to enter the PIN where other people may be able to view the PIN entry. Entering the PIN needs to be done securely. It is important that entry of the PIN not be observed by others. When the PIN is entered via the keypad, such entry is susceptible to being observed visually. That is, a bystander can watch the user enter the PIN. This can be referred to as shoulder surfing. The bystander can use a video camera record the PIN entry and to help the bystander later determine the PIN.

It is not uncommon for a surveillance camera to overlook the numeric keypad used for PIN entry. The images provided by such surveillance cameras can be accessed and used to determine a user's PIN. Such surveillance cameras and recorded archives are not always secure from unauthorized access. Also, an unauthorized surveillance camera can be installed by a fraudster who later returns to access the images captures thereby.

It is also possible for malware (malicious software) to be present on a device into which a user enters a PIN. The user will not know that the device can not be trusted and will enter the PIN. For example, a keystroke logger or other program that captures the PIN can be used to provide the PIN to an unauthorized person for later misuse.

It is desirable to provide a way for a user to enter a PIN that is substantially less susceptible to being observed or captured. Making it more difficult for fraudsters to obtain a user's PIN can substantially reduce misuse of the user's account.

SUMMARY

According to one or more embodiments, a user has an account with a payment provider, such as PayPal, Inc. When the user is ready to make a transaction, such as making a purchase or logging on to a public computer, the user is required to provide a personal identification number (PIN). The PIN (which can be numeric, alphabetic, symbolic, or images, as discussed below). can be verified securely using a physiological response of the user rather than by having the user type the PIN into a keypad. Thus, the PIN cannot readily be observed or intercepted and then used improperly by a fraudster at a later time.

According to one or more embodiments, methods and systems are provided for facilitating the secure entry of a user's PIN for electronic transactions such as merchant checkout, payment authorization, or access authorization. A physiological response of the user can indicate which one of a randomly presented sequence of numbers is a number of the user's PIN. The number selected from the random sequence can be communicated to a payment server using timing information, e.g., information representative of when the number was selected instead of the selected number itself. This timing offset makes it even more difficult for malware on the input system to capture the user's PIN. This process can be repeated for each number of the user's PIN.

The physiological response can be a slight or subtle facial or body movement. For example, the user can blink, wink, smile, frown, wave, or make a subtle facial movement to provide the indication. The physiological response can be the user's voice or another sound made or controlled by the user.

According to one or more embodiments, brain activity can be sensed to indicate which one of a random sequence of numbers is a number of the user's PIN. For example, the user can concentrate, tense muscles, or do nothing conscious at all. A brain wave sensor, e.g., an electro encephalograph (EEG) can sense brain activity associated with a thought, a muscle contraction, or the user's recognition of the number of the user's PIN.

According to one or more embodiments, the user can actuate a switch to indicate which one of a random sequence of numbers is a number of the user's PIN. For example, the user can press a button or can press a key of a keyboard. The button or key can require very little movement such that it is difficult for someone observing the user to determine whether or not the button or key has been pressed. When a key of a keyboard is pressed, it need not be a key that corresponds to the number of the PIN. Rather, pressing the key can merely be an indication that a number of the user's PIN has been highlighted. The physiological response can be a slight movement of a mouse or other input device. The use of a button or the like can be a fall back for any instances where the use of another physiological response failed to work.

According to one or more embodiments, a system can comprise a memory for storing account information for a plurality of users. The account information can include a personal identification number (PIN) for at least some of the users. A processor can receive a communication including an indication of a desire of a user to authorize a transaction. The processor can access an account of the user, provide one or more random sequences of numbers to the user, receive timing information that is at least partially indicative of selected numbers of the random sequence(s) from the user, make a reconstructed PIN from the random sequence(s) and the timing information, and authorize the transaction if the reconstructed PIN is the PIN of the user. The timing information can be dependent upon when (at what absolute or relative time) the user provides a physiological response as the numbers of the random sequence(s) are being highlighted.

Methods and systems facilitate the entry of a PIN in a manner that is substantially less susceptible to being observed or captured as compared to contemporary keypad PIN entry. Since the keys of a keypad corresponding to the PIN are not pressed, shoulder surfing is substantially inhibited. Since the user or merchant device being used for PIN entry stores and communicates time information rather than key strokes, the use of malware to capture the PIN is substantially inhibited.

DETAILED DESCRIPTION

According to one or more embodiments, a user has an account with a payment provider, such as PayPal, Inc. The payment provider can facilitate the authorization of transactions by verifying the user's personal identification number (PIN). Methods and systems are provided for facilitating the secure entry of a user's PIN and for securely providing the user's PIN to the payment provider. Entry of the PIN can be for electronic transactions such as merchant checkout, payment authorization, access authorization, or for any other reason.

A physiological response of the user can indicate which one of a random sequence of numbers is a number of the user's PIN. The physiological response can be muscular, verbal, or mental. For example, the user can blink, wink, make a subtle facial movement, make a sound, concentrate, or otherwise react to provide the indication that one of the numbers of the user's PIN has been highlighted on a display. This process can be repeated, in turn, for each number of the user's PIN.

Figure 1:
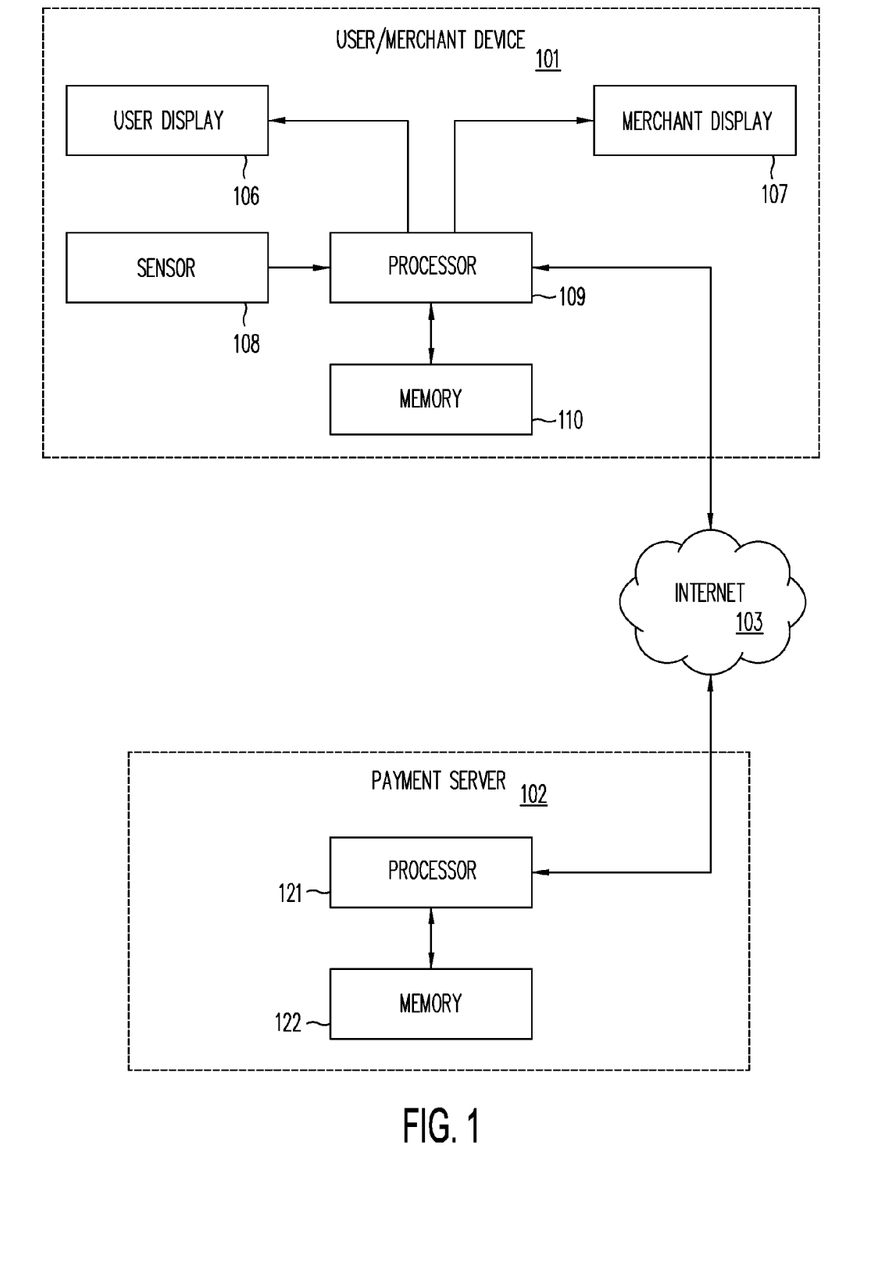
FIG. 1 is a block diagram showing a system for facilitating physiological response PIN entry, in accordance with one or more embodiments.

FIG. 1 is a block diagram showing a system for facilitating physiological response PIN entry, in accordance with one or more embodiments. The system can include a user/merchant device 101. The user/merchant device 101 can be a merchant terminal, a point-of-sale checkout system, a cellular telephone (such as a smart phone), or a computer. The user/merchant device 101 can be owned by the user, can be owned by a merchant, or can be owned by anyone else. The user/merchant device 101 can be located at the user's home, at a merchant's store, or anywhere else. The user/merchant device 101 can be any device or system for which a PIN can be used to facilitate authorization of a transaction or authorization of a user to access or use the user/merchant device 101 or any other device.

For example, the user/merchant device 101 can be a merchant terminal or a point-of-sale checkout system into which a user must enter a PIN to authorize a purchase transaction. Thus, the user/merchant device 101 can be located in a brick and mortar store. As a further example, the user/merchant device 101 can be an automated teller machine (ATM). For example, the user/merchant device 101 can be an ATM from which the user desires to withdraw money and/or obtain an account balance.

The device can be a mobile phone with an application that is not fully trusted by the payment provider, e.g., PayPal, Inc. The phone camera can capture the gesture or the user could nudge or tilt the phone to select the PIN or provide the physiological response.

As a further example, the user/merchant device 101 can be a game console. The game console can be in an Internet café or the like. The game console can be in the user's home. The PIN can be required to facilitate log on to a game. As a further example, the user/merchant device 101 can be a public web browser. For example, the user/merchant device 101 can be a public web browser located at an Internet café or the like.

As a further example, the user/merchant device 101 can be kiosk. For example, the user/merchant device 101 can be a Coinstar kiosk. Coinstar kiosks can give a user cash, cards (such as prepaid credit cards or gift cards which can be used to make purchases), rewards, eCertificates, etc. in exchange for coins. Some of the programs offered by Coinstar and other kiosks require that a user log on.

The user/merchant device 101 can have a processor 109 in communication with a user display 106 and a merchant display 107. The user display 106 can be a display that can be seen by the user during a transaction. The merchant display 107 can be a display that can be seen by a merchant or the like during a transaction. The processor 109 can also be in communication with a memory 110 and a sensor 108. The memory 110 can contain instructions, e.g., programming for the user/merchant device 101.

According to one or more embodiments, the sensor 108 can sense a physiological response of the user. For example, the sensor 108 can sense a blink, a wink, or a subtle facial or other body movement of the user such as tilting a cellular telephone or the like. For example, the user can move, e.g., tilt, the cellular telephone when a number of the PIN is highlighted. For example, the sensor 108 can sense brain activity of the user. A brain wave sensor or electro encephalogram can sense brain activity associated with the user's thoughts or recognition of the number of the user's PIN. The brain wave sensor can be part of a hat, helmet, or other item that is worn or placed in close proximity with the user's head.

The sensor 108 can be a camera or other sensor capable of sensing subtle movements of the user. The camera can cooperate with software to determine changes in an image that are indicative of a physiological response.

The sensor 108 can be a brain wave sensor that can sense brain activity associated with the user's recognition of the number of the user's PIN. The sensor 108 can be any type of sensor or combination of sensors suitable for sensing a physiological response of the user.

The sensor 108 can be a button and/or can sense when a button or other switch or input device is actuated. The button can be hidden from view by bystanders. The button can be shielded from view such that a user's hand that is operating the button is also shielded from view.

The system can include a payment server 102. The payment 102 server can be a computer or server. The payment server 102 can have a processor 121 configured to communicate with a memory 122. The payment server 121 can be a server of a payment provider, such as Paypal, Inc.

The user/merchant device 101 can communicate with the payment server 102, such as via a network. For example, the user/merchant device 101 can communicate with the payment server 102 via the Internet 103. Communication between the user/merchant device 101 and the payment server 102 can be wired, wireless, or any combination of wired and wireless.

When a user initiates a log on or transaction via the user/merchant device 101, the processor 121 of the payment server 102 can receive a communication from the user/merchant device 101 that includes an indication of a desire of the user to log on or authorize the transaction. The communication can be communicated from the user/merchant device 101 to the payment server 102 via the Internet 103, for example.

The processor 121 can access an account of the user. The account can be stored in the memory 122. The account can include information for the user (as well as for other users) including the user's PIN.

Figure 3:
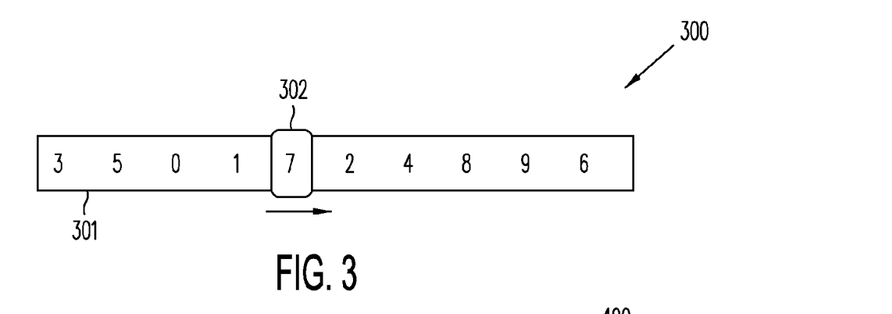
FIG. 3 is a one dimensional random sequence of the numbers 0 to 9 having one number highlighted, in accordance with one or more embodiments.
Figure 4:
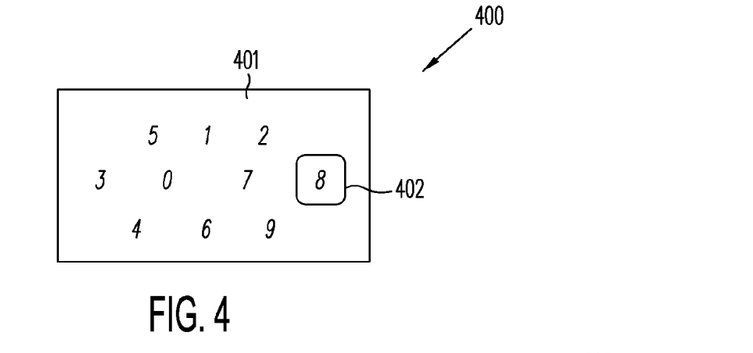
FIG. 4 is a two dimensional random sequence of the numbers 0 to 9 having one number highlighted, in accordance with one or more embodiments.
Figure 5:
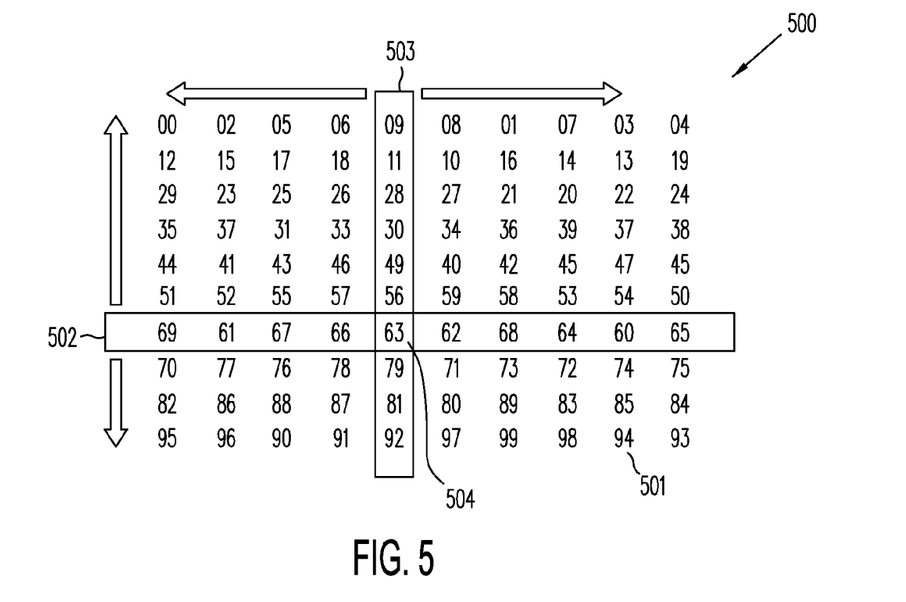
FIG. 5 is a two dimensional random array of the numbers 00 to 99 having one row highlighted and having one column highlighted, in accordance with one or more embodiments.

The payment server 102 can provide a random sequence of numbers to the user via the user/merchant device 101. The random sequence of numbers can be communicated from the payment server 102 to user/merchant device 101 via the Internet 103, for example. The random sequence of numbers can be used at the user/merchant device 101 to define a one dimensional array of single random numbers as shown in FIG. 3, a two dimensional group of single random numbers as shown in FIG. 4, or a two dimensional array of pairs of random numbers as shown in FIG. 5. The one dimensional array of single random numbers, the two dimensional group of single random numbers, or the two dimensional array of pairs of random numbers can be shown upon the user display 106.

The payment server 102 can alternatively provide an ordered sequence of numbers. The ordered sequence can be numerically ordered, reverse numerically ordered, or ordered in any other manner.

The one dimensional array of single random numbers shown in FIG. 3 and/or the two dimensional group of single random numbers shown in FIG. 4 can be used by the user to select single numbers of the PIN one at one time, as discussed below. Thus, a predetermined number of one dimensional arrays or two dimension groups can be communicated from the payment server 102 to the user/merchant device 101, wherein the predetermined number can correspond to the number digits in the user's PIN.

The two dimensional array of double random numbers shown in FIG. 5 can be used by the user to select pairs of numbers of the PIN at one time, as discussed below. These pairs of numbers can be consecutive numbers of the PIN. For example, the first pair of numbers can be the first two numbers of the PIN, the second pair of numbers can be the second two numbers of the PIN, and so on.

Thus, a number of two dimensional arrays can be defined by random sequences of numbers communicated from the payment server 102 to the user/merchant device 101 via the Internet 103. The number can correspond to one half of the quantity of numbers in the PIN for a PIN having an even quantity of numbers and the number can correspond to one half of the quantity of numbers in the PIN plus one for a PIN having an odd quantity of numbers. When the PIN has an odd quantity of numbers, the last array can be a one dimensional array such as that shown in FIG. 3.

Thus, a plurality of random sequences of numbers can be communicated by from the payment server 102 to user/merchant device 101 via the Internet 103. The number of random sequences can be that number which is necessary for the user to define the user's PIN by selecting one or more of the numbers in each of the random sequences.

Figure 2:
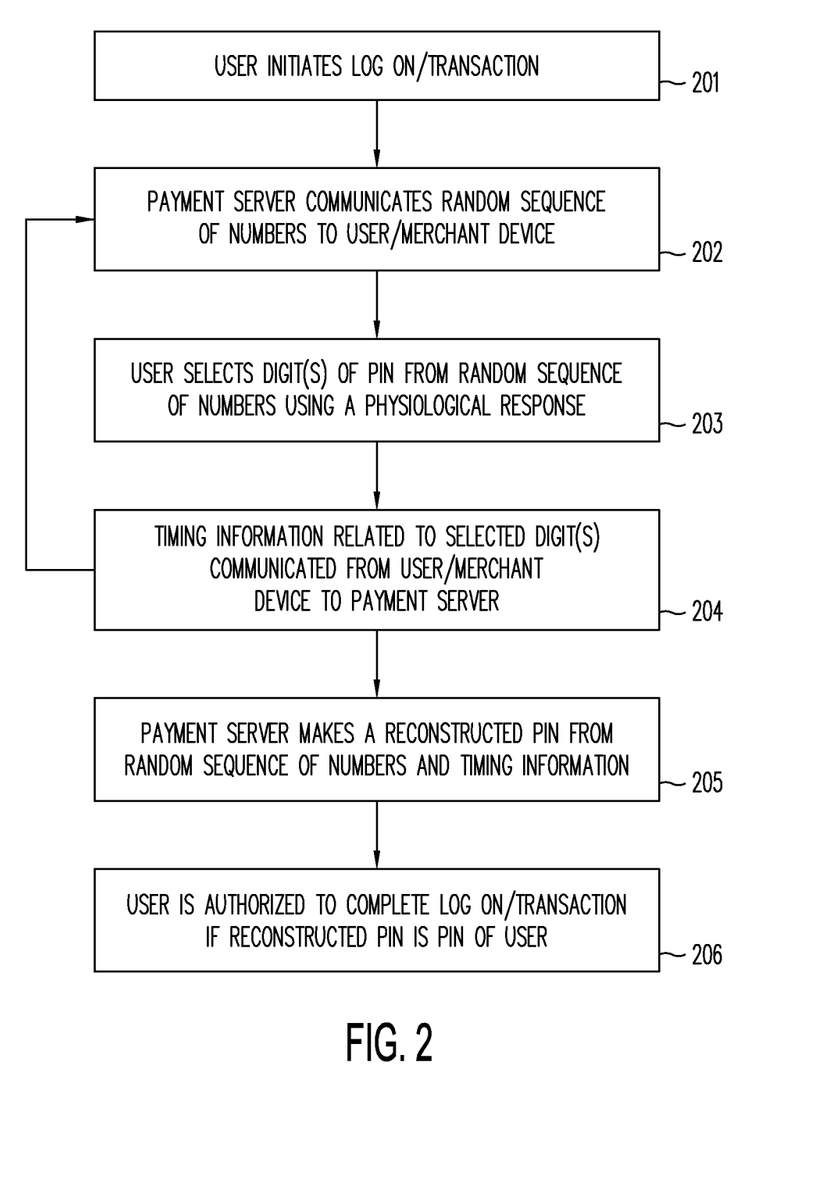
FIG. 2 is a flow chart showing physiological response PIN entry, in accordance with one or more embodiments.

FIG. 2 is a flow chart showing physiological response PIN entry, in accordance with one or more embodiments. A user initiates the log on/transaction, as shown in step 201. The payment server 102 communicates a random sequence of numbers to the user/merchant device 101, as shown in step 202. The random sequence of numbers can be presented to the user on the user display 106 as the one dimensional array of single random numbers shown in FIG. 3, the two dimensional group of single random numbers shown in FIG. 4, or the two dimensional array of pairs of random numbers shown in FIG. 5, for example.

The user selects numbers of the user's PIN from the random sequence of numbers using a physiological response of the user, as shown in step 203. The physiological response can be provided by the user when a number of the user's PIN is highlighted, as discussed below. The physiological response can be sensed by the sensor 108. The physiological response can be a blink, a wink, a subtle facial movement, concentration, tensing of muscles, or nothing conscience at all.

Timing information related to the selected numbers can be communicated from the user/merchant device 101 to the payment server 102, as shown in step 204. The timing information can be used to determine which numbers were selected by the user. The timing information can be indicative of which number of the random sequence of numbers is highlighted each time the user provided the physiological response.

For example, each number of the random sequence of numbers can be highlighted for approximately 500 milliseconds. Thus, if the physiological response is sensed 1,250 milliseconds after the random sequence of numbers commenced being displayed on the user display 106, then the third random number (that random number which is highlighted from elapsed time equals 1,000 milliseconds to elapsed time equals 1,500 milliseconds) has been selected by the user.

The timing information can be based upon absolute time or a relative time. The absolute time can be the local time, Greenwich Mean Time (GMT), or other clock time to which sensing of the physiological response can be related. The relative time can be the elapsed time from a predetermined starting point (such as when the random sequence is first displayed) to the point at which the physiological response was sensed. Using either the absolute time or the relative time, the payment server 102 can determine which number of the random sequence was being highlighted when the physiological response was sensed. The user/merchant device 101 can have a dedicated clock for determining the timing information or a clock of the processor 109 can be used for determining the timing information.

The timing information can include the times (either relative or absolute) at which the numbers of the random sequence are highlighted and the time that the physiological response is provided. For example, the timing information can include the time at which a highlight begins to move over the numbers of the random sequence and the time at which the user provided the physiological response. Since the payment server 102 can know the predetermine duration of time which the highlight spends on each number, the payment server 102 can determine which square is highlighted when the physiological response is provided.

Each number of the random sequence of numbers can be highlighted for 10 milliseconds to 1000 millisecond. Each number of the random sequence of numbers can be highlighted for a sufficiently short time that there is no perceptible pause of the highlight on the number. The highlight can move continuously over the random sequence of numbers without slowing down or stopping. After the user has provided the psychological response to select the number, the highlight can continue to move so that a shoulder surfer cannot readily determine which number was selected. The period of time for which each number is highlighted can be the same for each number or can be different, e.g., random for each number. The payment server 102 can determine the period of time for which each number is highlighted. Alternatively, the user/merchant device 101 can determine the period of time for which each number is highlighted and can communicate this information to the payment server 102. The starting point for the highlight can also be varied each time the display is presented to further thwart malware capture of the user's selection. That is, the highlight can start at a random position each time that a sequence of numbers is presented to the user.

The payment server 102 can make a reconstructed PIN from the random sequence of numbers and the timing information, as shown in step 205. Since the payment server 102 knows the sequence of the numbers in the random sequence and also knows how long each number is displayed, the payment server can determine which number is being selected by the user via the physiological response.

The payment server 102 can provide a different random sequence of numbers and the user can select one number of the random sequence for each number (or for each pair of numbers as shown in FIG. 5) of the user's PIN, as indicated by the arrow from step 204 to step 202. Thus, if the user's PIN contains six numbers, then six different random sequences can be provided by the payment server 102 and the user can make six different selections.

If the reconstructed PIN is the same as the user's PIN, then the user can be authorized to complete the log on/transaction, as shown in step 206. If the reconstructed PIN is not the same as the user's PIN, then the user can repeat the physiological PIN entry process.

FIG. 3 is a one dimensional random sequence 300 having one of the numbers 301 thereof highlighted by a box 302 or the like, in accordance with one or more embodiments. The one dimensional random sequence 300 can contain each of the numbers zero through nine. The random sequence 300 can be shown on the user display 106 for viewing by the user.

The random sequence 300 is shown in FIG. 3 as being oriented horizontally. The random sequence 300 can be oriented vertically or at any angle. The random sequence 300 need not be linear and can be curved. The random sequence 300 can have any shape or configuration.

The box 302 can highlight one of the numbers 301 at a time. Any other means of highlighting the numbers 301 one at a time can be used. The box 302 can move from left to right across the numbers 301. The box 302 can move from right to left across the numbers 301. After sweeping across the numbers 301, the box 302 can begin a new sweep in the same direction as the previous sweep or can sweep back and forth so as to alternate sweeping directions. The box 302 can move randomly or in any other fashion across or among the numbers 301.

The box 302 can move at any desired speed across the numbers 301. For example, the box 302 can move sufficiently rapidly across the numbers 301 so as to inhibit a bystander from readily determining which number is being selected by the user. The box 302 can move sufficiently slowly across the numbers 301 so as to allow the user to reliably select the desired number 301 by providing a physiological response when the next number of the user's PIN is highlighted.

Thus, during operation a first random sequence 300 is presented to the user and the box 302 begins to move across the numbers 301. Information representative of when the box 302 begins to move, e.g., timing information, can be communicated to the payment server 102. When the first number of the user's PIN is highlighted, the user provides the physiological response, e.g., blinks. The sensor 108, which can be a camera, senses the physiological response and communicates information representative of the time of the physiological response, e.g., timing information, to the payment server 102. The payment server 102 can determine which number 301 was selected using the known random sequence 300 and the timing information. This process can repeat for each number of the user's PIN.

When the entire PIN has been entered, the user can end the PIN entry process by pressing an enter button or the like, providing a gesture, or by any other means. The payment server 102 can automatically end the process when a valid PIN has been recognized or when a predetermined number of digits has been entered.

As an example, let's assume that the user wants to enter the PIN 4273. Once the user initiates the log on/transaction at the user/merchant device 101, the payment server 102 communicates the random sequence 300 to user/merchant device 101 and the user/merchant device 101 shows the random sequence 300 on the user display 106. The box 302 begins to sweep or move across the numbers of the random sequence 300 and the processor 109 of the user/merchant device 101 can store the time at which the sweep begins in memory 110. When the box 302 is over the first number of the user's PIN, i.e., 4, the user blinks. The sensor 108 senses the blink and the processor 109 can store the time of this psychological response in the memory 110.

The payment server 102 communicates a new random sequence 300 to user/merchant device 101 and the user/merchant device 101 shows the new random sequence 300 on the user display 106. Every random sequence 300 presented to the user can be different. Again, the box 302 moves over the random sequence 300 and the user blinks when the box 302 is over the second number of the user's PIN, i.e., 2, to select the second number of the PIN. The position and time at which the sweep begins and the time at which the blink is sensed can be stored in the memory 110. This process repeats for the third number, i.e., 7 and the fourth number, i.e., 3, of the PIN.

After all four numbers of the PIN have been selected by the user, then the user can press an enter key of the user/merchant device 101 to indicated that the PIN has been entered or the presentation can stop automatically after the last digit is selected. The user/merchant device 101 can communicate the timing information to the payment server 102. The timing information can be the elapsed time between the start of each sweep and the time at which the user blinked. The payment server 102 can use the known random sequence and the timing information for each number of the PIN to determine the number selected by the user.

FIG. 4 is a two dimensional random sequence 400 having one of the numbers 401 thereof highlighted by a box 402 or the like, in accordance with one or more embodiments. The two dimensional random sequence 400 can contain each of the numbers zero through nine. The random sequence 400 can be shown on the user display 106 for viewing by the user.

The random sequence 400 is shown in FIG. 4 as being generally rectangular. The random sequence 400 can be elongated, square, round, oval, or any other shape.

The box 402 can highlight one of the numbers 401 at a time. Any other means of highlighting the numbers 401 one at a time can be used. The box 402 can move randomly or in any other fashion across or among the numbers 401.

The box 402 can move at any desired speed across the numbers 401. For example, the box 402 can move sufficiently rapidly across the numbers 402 so as to inhibit a bystander from readily determining which number is being selected by the user. The box 402 can move sufficiently slowly across the numbers 402 so as to allow the user to reliably select the desired number 401 by providing a physiological response when the next number of the user's PIN is highlighted.

Thus, during operation a first random sequence 400 is presented to the user and the box 402 begins to move among the numbers 401. Information representative of the time at which the box 402 begins to move, e.g., timing information, can be communicated to the payment server 102. When the first number of the user's PIN is highlighted, the user provides the physiological response, e.g., blinks. The sensor 108, which can be a camera, senses the physiological response and communicates information representative of the time of the physiological response, e.g., timing information, to the payment server 102. The payment server 102 can determine which number 401 was selected using the known random sequence 400 and the timing information. This process can repeat for each number of the user's PIN.

When the entire PIN has been entered, the user can end the PIN entry process by pressing an enter button, providing a gestures, or by any other means. The payment server 102 can automatically end the process when a valid PIN has been recognized or when a predetermined number of digits has been entered.

Use of the two dimensional random sequence 400 of FIG. 4 is much like use of the one dimension random sequence 300 of FIG. 3, with the exception that the cursor moves in two dimensions, e.g., from side to side and up and down instead of in one dimension e.g., only from side to side.

FIG. 5 is a two dimensional random array 500 of the numbers 501 containing digits from 00 to 99 and having one row indicated by a row highlight 502 and having one column indicated by a column highlight 503, in accordance with one or more embodiments. Use of the two dimensional random array 500 allows two numbers of the user's PIN to be selected at one time. Thus, a four number PIN can be entered with only two selections being made by the user.

For example, one row after another can be indicated with the row highlight 502, which can be a box or the like. That is, the row highlight 502 can sweep through the rows one at a time. When the row having the first two numbers of the user's PIN is indicated by the row highlight 502, then the user can provide a physiological response. The row highlight 502 can then disappear and the column highlight 503 can appear. Next, one column after another can be indicated using the column highlight 503, which can be a box or the like. The row highlight 502 can be different from the column highlight 503. The column highlight 503 can sweep through the columns one at a time. When the column having the first two numbers of the user's PIN is highlighted, the user can provide a physiological response. The sweep of the row highlight 502 can be simply up and down or can be random. The sweep of the column highlight 503 can be simply from side to side or can be random. The sweeps of the row highlight 502 and column highlight 503 can be in any desired manner.

The payment server 102 can use timing information and the known random sequence of the two dimensional array 500 to determine which two numbers have been selected. The timing information can facilitate determination of which row and column the user selected. The first two numbers of the user's PIN will be at the intersection 504 of the selected row 502 and the selected column 503.

The timing information can include an elapsed time from a start of a sweep of the row highlight 502 or the column highlight 503 to the time that a physiological response was provided by the user. Thus, the payment server 102 can determine the row and column where the pair of numbers of the user's PIN is located. Since the payment server 102 knows the layout of the two dimension array (the payment server 102 provided the random sequence 500), the payment server 102 can determine which two numbers of the user's PIN were selected.

After the first two numbers of the user's PIN are selected, then the next two numbers of the user's PIN can be selected and this process can repeat until all of the numbers of the user's PIN have been selected. If the user's PIN contains an odd number of numbers, then a single number will remain after all of the pairs of numbers have been selected. In this instance, the one dimensional array of FIG. 3 can be used to select the remaining number, as discussed above.

The numbers 301, 401, 501 of the random sequence 300, 400, 500 can be present in an image (such as a raster image) rather than as text (such as ASCII text). Each number 301, 401, 501 of the random sequence can have a different font, size, alignment and/or spacing. A series of images can be used to show the highlight moving from one number, row, or column to another.

The random sequence 300, 400, 500 can be created by a service such as an image service. The service can be part of a payment provider, or can be separate from a payment provider. The timing information can be communicated from the user/merchant device 101 to the service so that the service can determine each number of the PIN selected.

Movement of the highlight 302, 402, 502, 503 can be controlled by the processor 109 of the user/merchant device 101 or can be controlled by the processor 121 of the payment server 102. Movement of the highlight 302, 402, 502, 503 can be controlled by processor or device.

The term "PIN" as used herein can refer to any numeric, alphabetic, symbolic, or other items suitable for use in identifying an individual. For example, the PIN can comprise a series of images. The PIN can comprise any combination of numbers, letters, symbols, and images.

The term "physiological" can refer to any process or action of the human body. Thus, a physiological response can be muscular, verbal, or mental. A physiological response can be voluntary or involuntary. For example, an involuntary physiological response can be the recognition of a number of the user's PIN. The physiological response can be any response of the user's body or any item, device, or system controlled by the user.

The term "transaction" as used herein can be any desired interaction of a user with a computer and/or network. For example, a transaction can be a merchant checkout, a payment authorization, or an access authorization (such as to a game or network). A transaction can be anything for which authorization is required, such as authorization based upon the use of a PIN.

The term "random" as used herein can be defined to include truly random and/or pseudo random. Any type of random number generator can be used to provide the random sequence.

The term "highlight" as used herein can include any graphic indication which facilitates the selection of one number from a plurality of numbers. For example, the highlight can be a cursor, arrow, bold, underscore, change of font, change of style, change of size, change of color, or any other way of distinguishing one number from other numbers.

The term "payment server" as used herein can include any computer or server suitable for use in the described process. The payment server can provide a PIN image service wherein the payment server provides an image that includes potential numbers of a user's PIN, the numbers can be highlighted one at a time, and based upon the timing of the highlighting and the timing of a physiological response of the user, the payment server can determine which one of the numbers the user has selected as being a number of the user's PIN. The image can be a raster image or a vector image. The terms "payment server" and "payment provider" can be used synonymously herein.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as a processing component (e.g., processor, microcontroller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Logic may be encoded in a computer readable and executable medium, which may refer to any medium that participates in providing instructions to the processor for execution. Such a medium may take many forms, including but not limited to, non-volatile media, volatile media, and transmission media. In one embodiment, the computer readable medium is non-transitory. In various implementations, non-volatile media includes optical or magnetic disks, such as disk drive component, volatile media includes dynamic memory, such as system memory component, and transmission media includes coaxial cables, copper wire, and fiber optics, including wires that comprise bus. In one example, transmission media may take the form of acoustic or light waves, such as those generated during radio wave and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PTSN, or various other wired or wireless networks) may perform instruction sequences to practice the invention in coordination with one another.

Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Methods and systems facilitate entry of a PIN in a manner that is substantially less susceptible to being observed or captured. Since no keys of a keypad are pressed, shoulder surfing is substantially inhibited. Since the user is facing the user display 106, a shoulder surfer could only see the user's face or the user display 106, but not both at the same time, as would be required to determine the user's PIN. The random format, location, or sequence of the numbers make it more difficult for shoulder surfers and malware to determine the user's number selection. Since the user or merchant device used for PIN entry stores and communicates time information rather than key strokes, the use of malware to capture the PIN is substantially inhibited. Thus, a more secure alternative to contemporary keypads for PIN entry is provided.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A method comprising:
performing, by a processor, a randomization corresponding to a sequence of symbols, the randomization including causing a highlighting order corresponding to the sequence of symbols to be randomized;
providing, by the processor, the randomized sequence of symbols for selection to a user, wherein individual ones of the symbols are highlighted in the highlighting order;
receiving, by the processor, timing information associated with one or more instances of beginning highlighting the individual ones of the symbols and one or more instances of receiving a physiological response indicative of one or more selections of the individual ones of the symbols being highlighted, the physiological response comprising one or more facial or body movements;
determining, by the processor, which of the symbols are selected based on the timing information and the highlighting order;
determining, by the processor, a secure value based on the selected symbols; and
performing, by the processor, an authorization using the secure value.

2. The method of claim 1, wherein the physiological response comprises one or more of a determined blink, a wink, a smile, or a frown.

3. The method of claim 1, wherein the physiological response comprises tilting an input device coupled to the processor.

4. The method of claim 1, wherein an input device for the physiological response is a mouse.

5. The method of claim 1, wherein each of the symbols is a letter, a number, or an image.

6. The method of claim 1, wherein a selection of a symbol corresponding to the instance of beginning highlighting the individual ones of the symbols causes two numbers of the secure value to be selected.

7. The method of claim 1, wherein the secure value is a personal identification number (PIN).

8. The method of claim 1, wherein determining which of the symbols are selected further comprises:
determining time differences between the instances of receiving the physiological response and the instance of beginning the highlighting associated with each one of the selected symbols; and
determining the selected symbols based on the time differences.

9. A system, comprising:
a non-transitory memory storing account information for a plurality of users, the account information including a secure value for at least some of the users;
one or more hardware processors coupled to the non-transitory memory and configured to execute instructions to cause the system to perform operations comprising:
performing a randomization corresponding to a sequence of symbols, the randomization including causing a highlighting order corresponding to the sequence of symbols to be randomized;
providing the randomized sequence of symbols for selection, wherein individual ones of the symbols are highlighted in the highlighting order;
receiving timing information associated with one or more instances of beginning highlighting the individual ones of the symbols and one or more instances of receiving a physiological response indicative of one or more selections of the individual ones of the symbols being highlighted, the physiological response comprising one or more facial or body movements;
determining which one of the symbols are selected based on the timing information and the highlighting order;
determining a first secure value based on the selected symbols; and
performing an authorization using the first secure value and the account information.

10. The system of claim 9, wherein the physiological response comprises one or more of a determined blink, a wink, a smile, or a frown.

11. The system of claim 9, wherein the physiological response comprises tilting an input device coupled to at least one of the one or more hardware processors.

12. The system of claim 9, wherein each of the symbols is a letter, a number, or an image.

13. The system of claim 9, wherein the first secure value is a personal identification number (PIN).

14. The system of claim 9, wherein determining which of the symbols are selected further comprises:
determining time differences between the instances of receiving the physiological responses and the instance of beginning the highlighting associated with each one of the selected symbols; and
determining the selected symbols based on the time differences.

15. The system of claim 9, wherein the operations further comprise:
determining a second secure value based on the selected symbols; and
wherein performing the authorization comprises using the first and second secure values and the account information.

16. A non-transitory machine-readable medium having stored thereon machine-readable instructions executable to cause a machine to perform operations comprising:
performing a randomization corresponding to a sequence of symbols, the randomization including causing a highlighting order corresponding to the sequence of symbols to be randomized;
providing the randomized sequence of symbols for selection, wherein individual ones of the symbols are highlighted in the highlighting order;
receiving timing information associated with one or more instances of beginning highlighting the individual ones of the symbols and one or more instances of receiving a physiological response indicative of one or more selections of the individual ones of the symbols being highlighted, the physiological response comprising one or more facial or body movements;
determining which one of the symbols was selected based on the timing information and the highlighting order;
determining a secure value based on the selected symbols; and
performing an authorization using the secure value.

17. The non-transitory machine-readable medium of claim 16, wherein:

the physiological response comprises one or more of a determined blink, a wink, a smile, or a frown, and tilting an input device; and wherein each of the symbols is a letter, a number, or an image.

18. The non-transitory machine-readable medium of claim 16, wherein determining which one of the symbols are selected comprises:

determining time differences between the instances of receiving the physiological response and the instance of beginning the highlighting associated with each one of the selected symbols; and determining the selected symbols based on the time differences.

19. The computer program product of claim 16, wherein an input device for the physiological response is a mouse.

20. The computer program product of claim 16, wherein the secure value is a personal identification number (PIN).

* * * * *